Sept. 8, 1959 C. A. NICKERSON 2,903,059

CYCLE MEASURING MEANS

Filed Oct. 1, 1957 2 Sheets-Sheet 1

INVENTOR
C. A. NICKERSON
BY

ATTORNEY

Sept. 8, 1959 C. A. NICKERSON 2,903,059

CYCLE MEASURING MEANS

Filed Oct. 1, 1957

2 Sheets-Sheet 2

INVENTOR
C. A. NICKERSON
BY V. P. Priolo
ATTORNEY

United States Patent Office 2,903,059

Patented Sept. 8, 1959

2,903,059

CYCLE MEASURING MEANS

Clifford A. Nickerson, Bernardsville, N.J., assignor to Bell Telephone Laboratories, Incorporated, New York, N.Y., a corporation of New York Application October 1, 1957, Serial No. 687,551

6 Claims. (Cl. 161—19)

This invention relates to cycle measuring means, and particularly to means for measuring the duration of a cycle such as the incoming message cycle in an automatic telephone answering and message recording device.

In the automatic telephone answering and recording device disclosed in United States Patent 2,761,899, the timing of the major functions of both the announcement and incoming message cycles, including the duration of the latter, is controlled by a cam tower as shown in Fig. 24 of said patent. The tower incorporates two sets of spring pileups and associated cams with one set related to the announcement cycle and the other to the incoming message cycle, a friction clutch specific to each set of cams, appropriate gearing to enable the cams to be driven at the desired speed through the clutches, and actuating linkages for each clutch. In operation, the clutch gearing is driven by the shaft which drives the record drums, and one or the other clutch is actuated to cause the associated cams to rotate. Rotation continues until the cycle is terminated. The clutch is then released and the cams are returned to their starting position by the action of a return spring.

In this device the individual incoming message cycle must be completed within a specified time interval. There is no provision for changing the length of this interval. At the end of this maximum time interval the cam which measures the duration of the incoming message cycle actuates a switch to disconnect the calling party from the telephone line and restore the device to its normal stand-by condition.

It is an object of this invention to provide means for measuring a cycle determined by the operation of a switch controlled by the rotation of a cam.

It is a further object of this invention to provide means for measuring the duration of a cycle determined by the operation of a switch and controlled by the rotation of a cam in a device such as an automatic telephone answering and recording device.

In accordance with this invention, the above-noted objectives are satisfactorily met by including in a device of the type disclosed in United States Patent 2,761,899, means for interrupting the continuity of rotation of the incoming message cycle control cam for a predetermined time interval. In the embodiment of this invention, shown in the drawings described hereinafter, this means comprises a ratchet secured to the control cam, a pawl, circuit means for actuating said pawl to engage said ratchet, switch means for energizing said circuit means and an auxiliary cam for actuating said switch means to hold said circuit means energized for a predetermined interval.

The basic message time is determined by allowing the control cam to rotate until the cycle has been timed out. To increase this time, an interval is added during which the control cam is prevented from rotating. At the end of this interval, the control cam is allowed to resume its rotation until the cycle has been timed out. The total message time is, therefore, equal to the sum of three separate periods; namely, the time from the start of rotation of the control cam until its rotation is interrupted, the time the control cam remains arrested, and the time between the resumption of rotation of the control cam and the termination of the cycle.

The nature of the invention and its distinguishing features and advantages will be more clearly understood from the following detailed description and the accompanying drawings in which.

Figure 2:
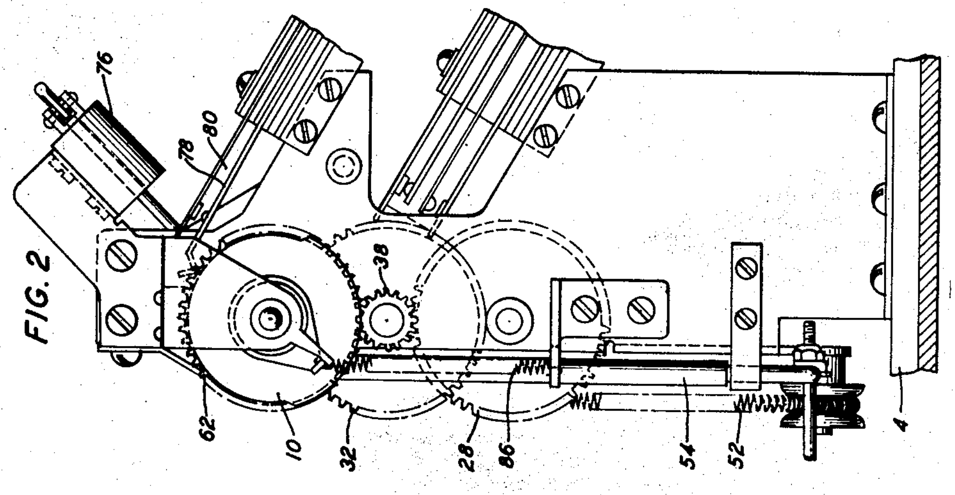
Fig. 2 is a view in side elevation of the embodiment shown in Fig. 1.

Referring now to the drawings, cam tower 2, mounted on frame 4, comprises the outgoing or announcement message cam assembly 6, the incoming message cam assembly 8 and the auxiliary incoming message cam 10. As described in United States Patent 2,761,899, various timing functions are performed by cams 12, 14 and 16 which rotate together as a unitary structure and cams 18, 20 and 22 which are also adapted to rotate together. Cam 10 and cams 18, 20 and 22, which are supported by and rotate on shaft 23, start their cycle of rotation together. However, as will be described hereinafter, cam 10 rotates continuously while the rotation of cams 18, 20 and 22 may be interrupted for an interval determined by lobe 24 on cam 10.

Gears 26, 28 and 30 are driven continuously by gear 32 through gears 34, 36 and 38 respectively, which are secured to the common drive shaft 39. Gear 32 is driven by gear 40 on the main drive shaft 42 of the incoming message drum 44 and the outgoing message drum (not shown). When lever 46 is actuated, clutch plate 48 engages clutch 50 which is affixed to gear 28. Cams 12, 14 and 16 then rotate to complete the outgoing message cycle. On completion of this cycle, clutch 50 is released and cams 12, 14 and 16 are returned to their normal positions by spring 52 which is attached to cam assembly 6.

The incoming message cycle is then initiated and lever 54 is actuated. This causes clutch plate 56 to engage clutch 58 which is affixed to gear 26 and clutch plate 60 to engage clutch 62 which is affixed to gear 30. Cams 18, 20, 22 and 10 then rotate to complete the incoming message cycle. This cycle is completed when lobe 64 on cam 22 actuates spring member 66 to open switch 68. The opening of switch 68 deenergizes relay 70, which was initially energized in response to ringing signal on the telephone line, and motor 72 to restore the answering-recording device to its normal condition.

Figure 3:
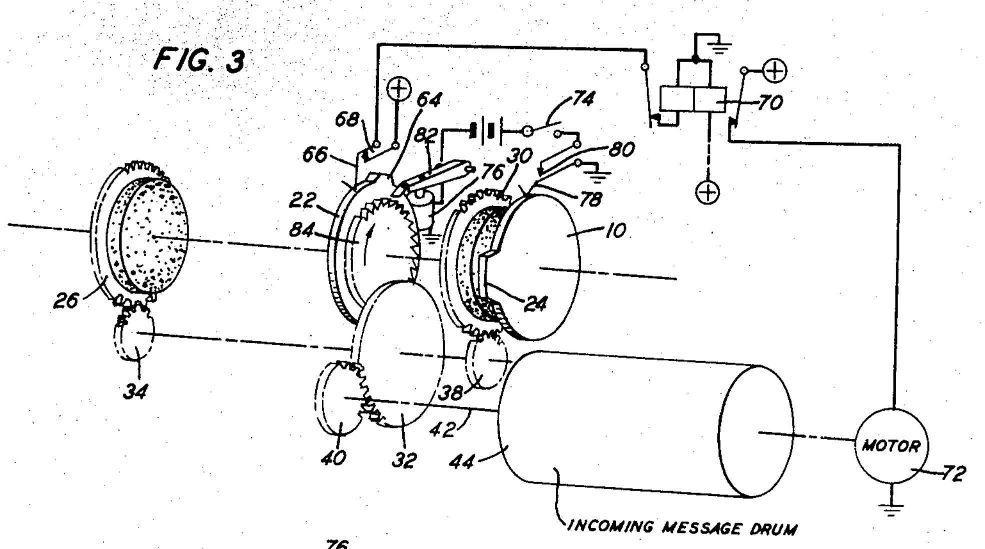
Fig. 3 is a diagrammatic disclosure of the electrical and mechanical controls for the present invention.
Figure 4:
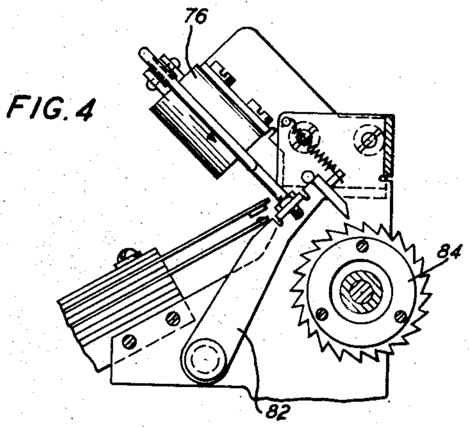
Fig. 4 is a sectional view taken on the line 4—4 of Fig. 1.

As shown in Fig. 3, if switch 74 is closed, either by manual or remote means, solenoid 76 will be energized when lobe 24 on cam 10 actuates spring member 78 to close switch 80. Energization of solenoid 76 will cause pawl 82 to engage ratchet 84 which is affixed to cam 22 and thereby interrupt the rotation of cams 18, 20 and 22. The rotation of these cams will be interrupted for an interval determined by the design of lobe 24. When lobe 24 is no longer effective and switch 80 reopens, pawl 82 will disengage ratchet 84 and cam 22 will again rotate until its cycle has been completed. On completion of this cycle, clutches 58 and 62 are released, cams 18, 20 and 22 are returned to their normal positions by spring 52 which is attached to cam assembly 8 and cam 10 is returned to its normal position by spring 86 which is attached thereto.

Accordingly, switch 74 provides the facility for choosing either of two message intervals.

Figure 1:
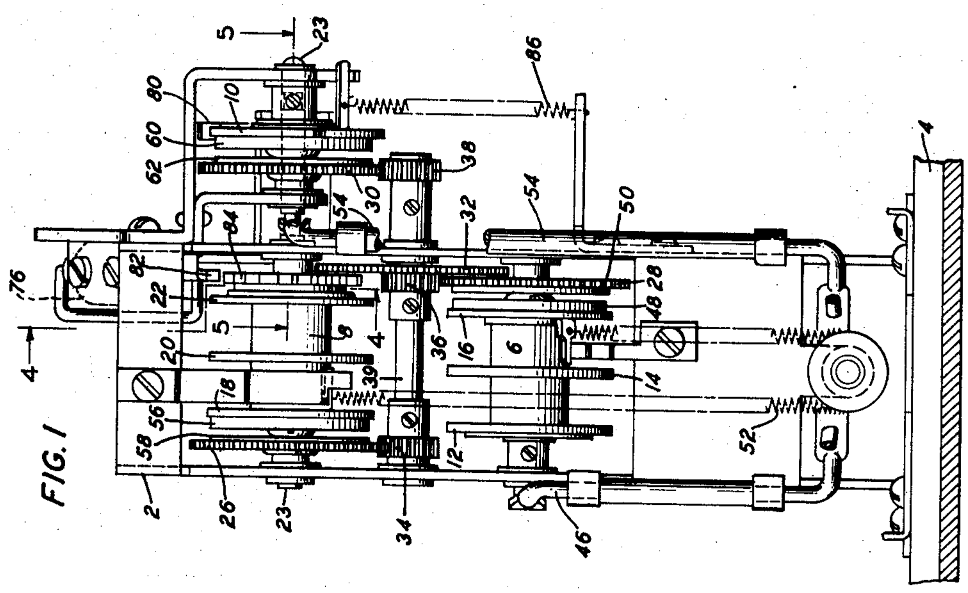
Fig. 1 is a view in front elevation of an embodiment of the present invention.
Figure 6:
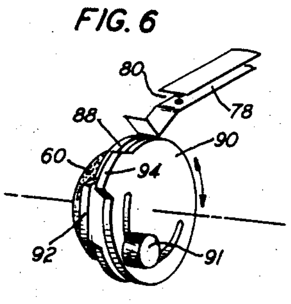
Fig. 6 illustrates a modified form of the cycle measuring cam means.
Figure 5:
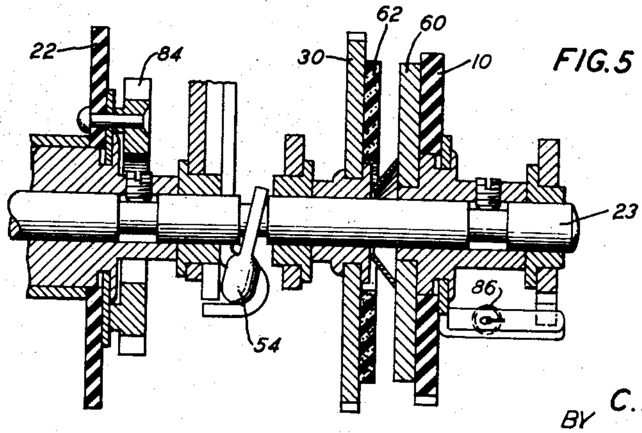
Fig. 5 is a sectional view taken on the line 5—5 of Fig. 1.

To extend further the flexibility of the embodiment shown in Figs. 1 and 3, cam 10 may comprise two discs as shown in Fig. 6. Disc 88 is secured to clutch plate 60, while disc 90 is capable of being rotated with respect to disc 88 and then locked in any desired orientation by means of locking member 91. The interval determined by the combination of lobes 92 and 94 may be varied to provide more than the two message intervals indicated in Fig. 3.

It is, of course, not necessary to confine the time during which cam 22 is stopped to one period only. Cam 22 may progress with a series of starts and stops if such an arrangement presents any advantage in a particular application.

Although the invention has been described as it might be applied to the telephone answering and recording device disclosed in United States Patent 2,761,899, it is generally applicable to functions which are instituted and ended by the operation of a switch.

It is to be understood that the above-described arrangements are illustrative of the application of the principles of the invention. Other arrangements may be devised by those skilled in the art without departing from the spirit and scope of the invention.

What is claimed is:

1. Cycle measuring means comprising first and second cams, spring means disposed in such manner as to retain said cams in a normal position, means for overcoming the retaining force of said spring means and imparting rotary motion to said cams, a first switch adapted to be actuated by said first cam after one revolution thereof to time out said cycle, means for interrupting the continuity of rotation of said first cam, said means comprising a ratchet secured to said cam, a pawl, and circuit means for actuating said pawl to engage said ratchet, said circuit means including a second switch adapted to be actuated by said second cam for a predetermined interval during the rotation of said second cam to energize said circuit means and thereby actuate said pawl, said second cam rotating continuously during said cycle and completing one revolution before said cycle is timed out, said cams being returned to their normal positions by said spring means after said cycle has been timed out.

2. Cycle measuring means in accordance with claim 1 wherein rotary motion is imparted to each of said cams simultaneously.

3. Cycle measuring means comprising first and second gears, first and second cams, clutch means for individually connecting said cams to said gears, spring means disposed in such manner as to retain said cams in a normal position, means for overcoming the retaining force of said spring means and imparting rotary motion to said gears, a first switch adapted to be actuated by said first cam after one revolution thereof to time out said cycle, means for interrupting the continuity of rotation of said first cam, said means comprising a ratchet secured to said first cam, a pawl, and circuit means for actuating said pawl to engage said ratchet, said circuit means including a second switch adapted to be actuated by said second cam for a predetermined interval during the rotation of said second cam to energize said circuit means and thereby actuate said pawl, said second cam rotating continuously during said cycle and completing one revolution before said cycle is timed out, said cams being disconnected from said gears and returned to their normal positions by said spring means after said cycle has been timed out.

4. Cycle measuring means in accordance with claim 3 wherein rotary motion is imparted to said gears by a first common shaft and said gears and cams rotate on a second common shaft.

5. Cycle measuring means in accordance with claim 3 wherein said cams are connected to said rotating gears simultaneously.

6. Cycle measuring means in accordance with claim 3 wherein said second cam comprises a plurality of adjacent discs rotatable with respect to each other to vary said predetermined interval.

References Cited in the file of this patent

UNITED STATES PATENTS

| | | |
|---|---|---|
| 2,374,590 | Dunham | Apr. 24, 1945 |
| 2,670,039 | Burkholder | Feb. 23, 1945 |
| 2,776,009 | Tamburr | Jan. 1, 1957 |